United States Patent
Pontious (10) Patent No.: US 9,256,866 B2
(45) Date of Patent: Feb. 9, 2016

(54) DRIVERS LICENSE LOOK-UP

(71) Applicant: Comenity LLC, Columbus, OH (US)

(72) Inventor: Tim Pontious, Columbus, OH (US)

(73) Assignee: Comenity LLC, Columbus, OH (US)

( * ) Notice: Subject to any disclaimer, the term of this patent is extended or adjusted under 35 U.S.C. 154(b) by 0 days.

(21) Appl. No.: 14/637,318

(22) Filed: Mar. 3, 2015

(65) Prior Publication Data

US 2015/0248726 A1 Sep. 3, 2015

Related U.S. Application Data

(60) Provisional application No. 61/947,347, filed on Mar. 3, 2014.

(51) Int. Cl.
| | |
|---|---|
| *G06Q 40/02* | (2012.01) |
| *G06Q 20/24* | (2012.01) |
| *G06Q 20/40* | (2012.01) |
| *G06Q 20/20* | (2012.01) |
| *G06Q 30/00* | (2012.01) |
| *G06Q 20/22* | (2012.01) |

(52) U.S. Cl.
CPC ............... *G06Q 20/24* (2013.01); *G06Q 20/20* (2013.01); *G06Q 20/227* (2013.01); *G06Q 20/40* (2013.01); *G06Q 20/401* (2013.01); *G06Q 30/0185* (2013.01); *G06Q 40/02* (2013.01)

(58) Field of Classification Search
CPC ... G06Q 20/24; G06Q 40/02; G06Q 30/0185; G06Q 20/40
USPC .................................................. 235/379, 380
See application file for complete search history.

(56) References Cited

U.S. PATENT DOCUMENTS

| | | | |
|---|---|---|---|
| 6,224,109 B1 * | 5/2001 | Yang ..................... | B42D 25/00 283/57 |
| 8,041,338 B2 | 10/2011 | Chen et al. | |
| 8,346,672 B1 | 1/2013 | Weiner et al. | |
| 8,577,803 B2 | 11/2013 | Chatterjee et al. | |
| 8,630,952 B2 | 1/2014 | Menon | |
| 8,639,621 B1 | 1/2014 | Ellis et al. | |
| 8,793,184 B2 | 7/2014 | Lakshminarayanan | |
| 8,856,045 B1 | 10/2014 | Patel et al. | |
| 8,905,303 B1 | 12/2014 | Ben Ayed | |
| 2002/0147679 A1 * | 10/2002 | Tardif .................... | G06Q 20/10 705/39 |
| 2008/0217400 A1 * | 9/2008 | Portano ................ | G06Q 20/403 235/380 |
| 2008/0275779 A1 | 11/2008 | Lakshminarayanan et al. | |
| 2009/0068982 A1 | 3/2009 | Chen et al. | |
| 2009/0106152 A1 | 4/2009 | Dill et al. | |
| 2010/0125510 A1 | 5/2010 | Smith | |
| 2012/0265682 A1 | 10/2012 | Menon et al. | |
| 2012/0310826 A1 | 12/2012 | Chatterjee et al. | |
| 2013/0132219 A1 | 5/2013 | Liberty et al. | |

(Continued)

*Primary Examiner* — Allyson Trail (57) ABSTRACT

A method for enabling a driver's license to be used as a credit account, including: accessing data from a scanned bar code of a driver's license; comparing the accessed data from the scanned bar code to a store of information comprising a stored set of profile information; based on the comparing, determining if a match between the accessed data and a stored set of profile information exists, and identifying a matched stored set of profile information; identifying a customer credit account, of the customer credit account information, linked to the matched stored set of profile information; generating an credit verification for the customer, such that, as to the customer, a particular transactional activity is allowed to be processed using the identified customer credit account.

20 Claims, 4 Drawing Sheets

(56) References Cited

U.S. PATENT DOCUMENTS

| | | |
|---|---|---|
| 2013/0346305 A1 | 12/2013 | Mendes et al. |
| 2014/0006276 A1 | 1/2014 | Grigg et al. |
| 2014/0129441 A1 | 5/2014 | Blanco et al. |
| 2014/0172577 A1 | 6/2014 | Rephlo et al. |
| 2014/0207680 A1 | 7/2014 | Rephlo et al. |
| 2014/0250005 A1 | 9/2014 | Amacker et al. |
| 2015/0106216 A1 | 4/2015 | Kenderov |
| 2015/0178693 A1 | 6/2015 | Solis |
| 2015/0278805 A1 | 10/2015 | Spencer, III et al. |

* cited by examiner

DRIVERS LICENSE LOOK-UP

CROSS-REFERENCE TO RELATED APPLICATIONS

This application claims priority to and benefit of co-pending U.S. Patent Application No. 61/947,347, filed on Mar. 3, 2014 entitled "DRIVERS LICENSE LOOK-UP" by Tim Pontious, and assigned to the assignee of the present application.

This application is related to co-pending U.S. patent application Ser. No. 14/637,327 filed on Mar. 03, 2015 entitled "CREDIT ACCOUNT LINKING SYSTEM", by Tim Pontious, and assigned to the assignee of the present application.

BACKGROUND

Credit card companies require merchants to check the picture identification of a person using a credit card issued by their company. These requirements help to reduce credit card fraud. However, these requirements are also burdensome and time consuming for the merchant and the customer alike. Additionally, when customers forget to take their credit cards with them while shopping, many times, they are not able to purchase a desired object.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

SUMMARY

The following is a summary of at least one embodiment of the present technology:

A driver license information converter for enabling a driver's license to be used as a credit card is described. The driver license information converter includes the following modules: a data accessor coupled with a computer, the data accessor configured for accessing data from a scanned bar code of a driver's license; a first comparer coupled with the computer, the first comparer configured for comparing the accessed data from the scanned bar code to a store of information comprising a stored set of profile information, wherein each profile information of the stored set of profile information is linked to customer credit account information of a set of customer credit account information; a first match determiner coupled with the computer, the first match determiner configured for, based on the comparing, determining if a match between the accessed data and the stored set of profile information exists, and wherein if the match exists, identifying a matched stored set of profile information; a customer credit card account identifier coupled to the computer, the customer credit account identifier configured for identifying a customer credit account, of the customer credit account information, linked to the matched stored set of profile information; and an credit verification generator coupled with the computer, the credit verification generator configured for generating an credit verification for the customer, such that, as to the customer, a transactional activity is allowed to be processed using the identified customer credit account.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Figure 1:
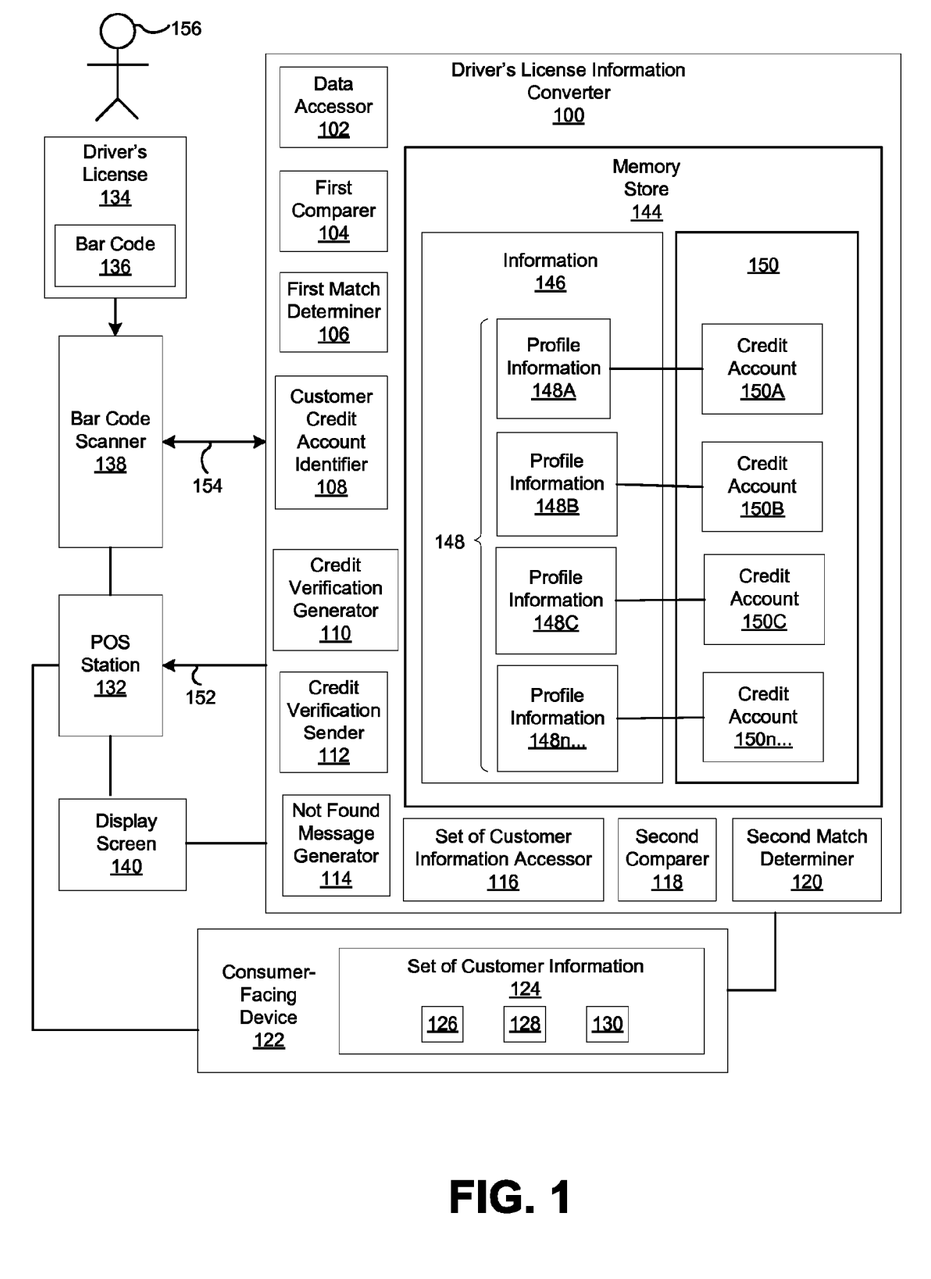
FIG. 1 is a block diagram that illustrates an embodiment of a driver's license information converter, in accordance with an embodiment.
Figure 2:
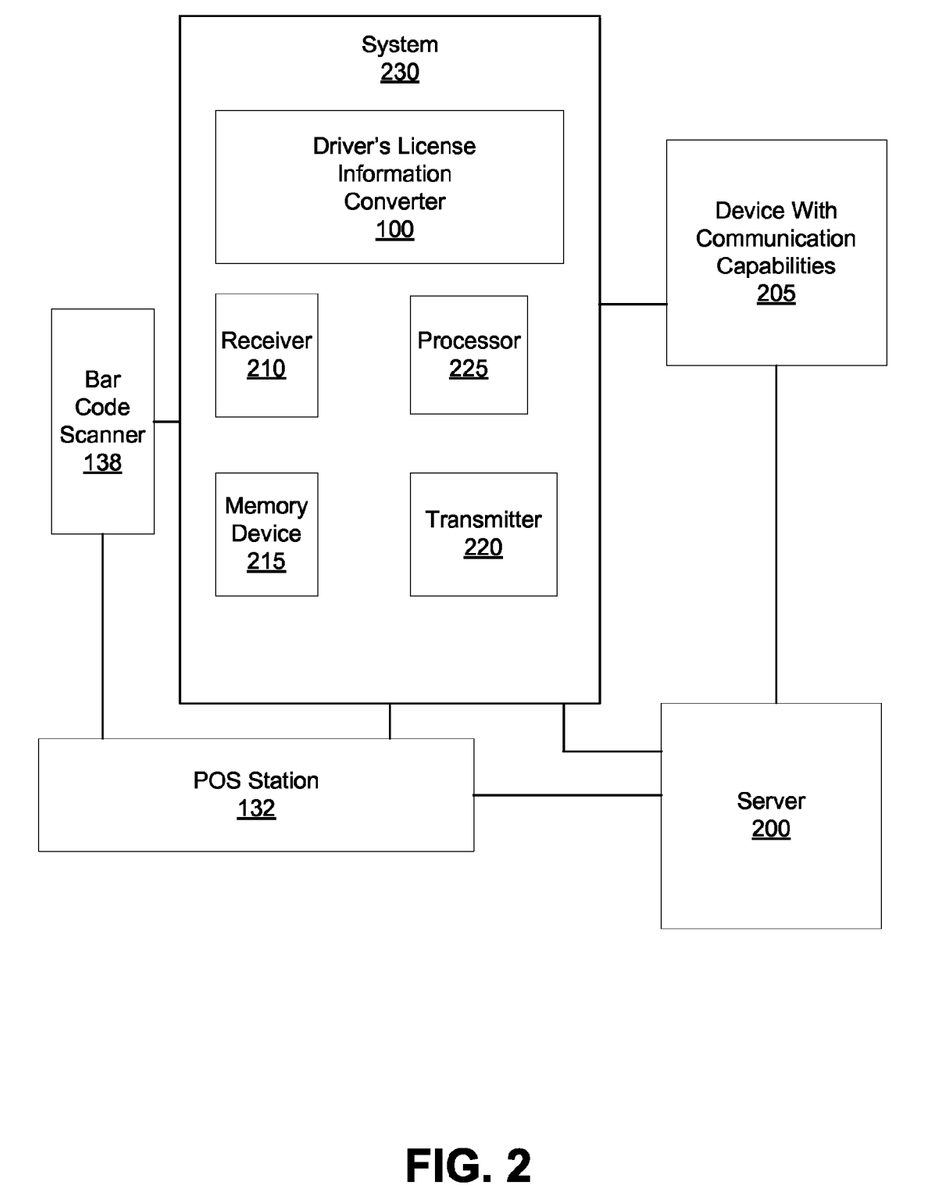
FIG. 2 is a block diagram that illustrates an embodiment of a system including a driver's license information converter, in accordance with an embodiment.

Unless specifically stated otherwise as apparent from the following discussions, it is appreciated that throughout the present Description of Embodiments, discussions utilizing terms such as "accessing," "comparing", "identifying", "generating", "sending", "determining", or the like, often refer to the actions and processes of an electronic computing device (or portion thereof), module or system, such as, but not limited to, a driver's license information converter (See FIGS. 1 and 2). The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

The following definitions apply:

"Consumer Facing Device": A device that allows direct interaction or communication with customers (e.g., signature capture, pin pad device, or bar code scanner).

"Driver's License": The term, "driver's license", includes any government issued identification. For example, but not limited to such example, a government issued identification may refer to a state issued driver's license, a state identification, a military identification, a federal identification, a locally-issued identification, a province in Canada, etc. The government issued identification may be issued by any governmental authority.

"Points of Service": Any channel where a transaction can be processed for a customer (e.g., Catalog, Web, Retail, Mobile, etc.).

"SSN": Any governmentally assigned social security number (e.g., United States, Canada, etc.).

Overview of Embodiments and Discussion

Credit card companies require merchants to check the picture identification of a person using a credit card issued by their company. These requirements help to reduce credit card fraud. However, these requirements are also a burden and time consuming for the merchant and customer alike. Additionally, many times, customers forget their credit cards when going shopping, so even if they wanted to buy something, they couldn't. Embodiments provide a way to both enable a consumer to purchase an item with just their driver's license, while also meeting the credit card companies' requirements designed to prevent fraud.

The following is a high-level non-limiting example of embodiments. As known, a person's driver's license has the person's photographic image printed thereon. In this example, a customer has deliberately left his credit card at home, as he intends to shop cardless. Embodiments enable the customer to utilize his driver's license to purchase an item in the alternative and/or in the absence of his credit card. In order to do this, the customer presents his driver's license to the store associate. The store associate uses a bar code scanner to scan the customer's driver's license's bar code. This scanned information is sent, via wire and/or wirelessly, to a driver's license information converter. The driver's license information converter determines which consumer credit card account in its database (memory store) is associated with the customer's driver's license. Once the customer's credit card account information is found, then the credit card account information is used to pay for an item that the customer desires to purchase. The customer may decide to use this method of payment instead of a credit card, because it saves both the customer and the merchant the time it takes to verify the customer's identification as to the information on the face of the credit card. Thus, embodiments provide a method for making payments using a driver's license only, thereby creating a more efficient way of purchasing goods, while maintaining integrity.

The following discussion will begin with a description of a driver's license information converter, with reference to FIGS. 1 and 2. The discussion will follow with a description of a method of operation, with reference to FIGS. 1-3. The discussion concludes with a description of an example computer system with which or upon which various embodiments of the present technology may be implemented.

Embodiments of a Driver's License Information Converter

FIGS. 1 and 2 depict block diagrams that illustrates an embodiment of a driver's license information converter 100 and a system that includes the driver's license information converter 100. The driver's license information converter 100 includes a data accessor 102, a first comparer 104; a first match determiner 106; a consumer credit account identifier 108; and a credit verification generator 110. In various optional embodiments, the driver's license information converter 100 further includes a credit verification sender 112; a not found message generator 114; a set of customer information accessor 116; a second comparer 118; a second match determiner 120; and a memory store 144. In another embodiment, the memory store 144 is located remote from but coupled with the driver's license information converter 100.

FIG. 1 further depicts the driver's license information converter 100 coupled with, via wire and/or wirelessly, the bar code scanner 138, the point of service ("POS") station 132, and the consumer-facing device 122. In one embodiment, the driver's license information converter 100 is located remote from the POS station 132. However, in another embodiment, the driver's license information converter 100 is located at the POS station 132. In various embodiments, the POS station 132 includes a cash register, a processor, and a credit card scanner that communicates with a group of credit card companies. In one embodiment, the driver's license information converter 100 is coupled to the processor located at the POS station 132.

The data accessor 102 is configured for accessing (i.e., receiving or retrieving) data from a scanned bar code 136 of a driver's license 134. The bar code 136 of the driver's license 134 is scanned in the bar code scanner 138. Of note, the bar code scanner 138 does not have to be located at a store; it could be located The data accessor 102 may either receive the scanned bar code data from the bar code scanner 138 coupled thereto via wire and/or wirelessly, or it may retrieve the scanned bar code data from the bar code scanner 138. Of note, the bar code scanner 138 does not have to be at a store. The bar code scanner 138 may be attached to a device located remotely from the store, such as a desktop computer or a mobile device (e.g., phone, tablet, laptop computer, etc.) In another embodiment, the driver's license information converter 100 accesses the scanned bar code data from the POS station 132. The POS station 132, in one embodiment, had received and/or retrieved the scanned bar code data from the bar code scanner 138.

The first comparer 104 is configured for comparing the accessed data from the scanned bar code to a memory store 144 of information 146 that includes a stored set of profile information 148A, 148B, 148C, and 148n . . . (hereinafter, "stored set of profile information 148", unless specifically noted otherwise), wherein each profile information (148A, 148B, 148C, and 148n . . . ) of the stored set of profile information 148 is linked to a customer credit account, such as the customer credit account 150A, 150B, 150C or 150n . . . of a stored set of customer credit accounts 150. For example, the bar code of Jim's driver's license is scanned into the bar code scanner 138. The data accessor 102 accesses the scanned bar code data. The memory store 144 of information 146 includes a stored set of profile information 148. The memory store 144 also includes a stored set of customer credit accounts 150 linked to the stored set of profile information 148. Each profile information, for example, profile information 148B, is grouped to relate to a single person, for example, "Person A". The credit card information that is linked to the profile information also relates to Person A. The first comparer 104 compares the scanned bar code data of the driver's license 134 to the stored set of profile information 148 at the memory store 144. The first comparer 104 organizes the data such that the first match determiner 106, as will be explained below, may identify a matched store set of profile information.

The first match determiner 106 determines if a match between the accessed data 154 and the stored set of profile information 148 exists. If the match exists, then a matched driver's license information is identified. For example, the first match determiner 106 finds, based on the comparison performed by the first comparer 104, that the scanned bar code data of Jim's driver's license contains information that matches the profile information 148C. For example, Jim's address recorded in the bar code 136 of the driver's license 134 matches a portion of the profile information 148C (which also contains Jim's address and birthdate). Therefore, in this example, the matched profile information is identified as profile information 148C. In various embodiments, the term "matching" (and variants thereof) refers to finding information in the set of profile information 148 that is required to be the same as the scanned bar code data. For example, in one embodiment, the driver's license information converter 100 is preprogrammed to require that all of the information that is associated with a driver's license must be the same as the scanned bar code data before the credit account associated with the profile information is allowed to be used to execute a payment. In another embodiment, the driver's license information converter 100 is preprogrammed to require that just the name and the driver's license number found in the scanned bar code data be the same as the name and the driver's license number in profile information of the set of profile information 148 before a credit account is allowed to be used to execute a payment. Thus, even though it is the case that the customer's scanned bar code driver's license information mostly matches with profile information of a set of profile information stored at a memory store, it may also be the case that all the matching requirements (involving preprogrammed constraints/requirements) are not met such that a matched profile information is not identified. In embodiments, these preprogrammed constraints/requirements are performed at the factory, by a business entity, and/or by the owner of the driver's license and credit account.

The customer credit account identifier 108 identifies a customer credit account, of the stored set of customer credit accounts 150, which is linked to the matched profile information, thereby achieving an identified customer credit account. For example, the customer credit account that is linked to the Jim's profile information 148C is that of consumer credit account 150C. The customer credit account 150C is considered to be the identified customer credit account.

The credit verification generator 110 generates a credit verification 152 for the customer 156, enabling the customer 156 to cause a transactional activity (e.g., sale, payment, return, void, etc.) to occur in association with the identified customer credit account. For example, the credit verification 152 that is generated verifies that a particular transactional activity is allowed to be processed using the identified customer credit account, such as the customer credit account 150C. Of note, the customer 156 need not be at a store's physical location in order to purchase goods and/or services. The customer 156 may be trying to access the goods and/or services from a place other than the location at which a physical store resides (e.g., from a home computer, etc.). In one embodiment, the identified customer credit account 150C is associated with a store for the particular store at which the customer 156 entered into the customer-facing device 122 his set of customer information 124. In another embodiment, the identified customer credit account 150C is associated with a store other than the store at which the customer 156 entered his set of customer information 124 into the customer-facing device 122.

Additionally, in one embodiment, the credit verification 152 includes information in addition to the determination of allowing the customer 156 to cause a transactional activity to be processed using the customer credit account (e.g., customer credit account 150C), such as, but not limited to, the following types of information: the customer's 156 amount of available credit remaining; the sales history for the customer 156; rewards and loyalty information connected with the customer's 156 customer credit account 150C; and offers, such as reward incentives, for the customer 156.

Of note, a source external to the memory store 144 uploads to the memory store 144 the information 146 (e.g., the set of profile information 148) and uploads the customer credit accounts 150A, 150B, 150C, and 150*n*. . . . This source may be a server 200 operated by a business, a device 205 with communication capabilities, or a POS station 132. The device 205 with communication capabilities may be operated by a business entity or an individual unaffiliated with any business.

The device 205 may be, but is not limited to being, any of the following: a laptop; a desktop; a tablet; a PDA; and a mobile phone.

The credit verification sender 112 sends the credit verification 152 to a POS station 132 via the transmitter 220 (see FIG. 2). As already noted herein, the point of service station 132 may be any channel at which a transaction can be processed for a customer (e.g., Catalog, Web, Retail, Mobile, etc.), and is not limited to being that of a "brick and mortar" retail store.

The "not found" message generator 114, if a match is determined to not exist, generates a "not found" message. The not found message indicates that the match is determined not to exist. The not found message is sent to the transmitter 220 (see FIG. 2); the transmitter 220 sends the not found message to the POS station 132. In receipt of this not found message, the POS station 132 displays the indication that the customer 156 does not have a credit account (as shown by the information stored at the memory store 144); thus, the credit verification 152 may not be generated. The store associate then has the option to provide the customer 156 with the opportunity to create a credit account, via the customer-facing device 122 and/or the POS station 132, with entered customer information that will be linked with a credit account.

The set of customer information accessor 116 accesses the set of customer information 124 that is particular to a customer 156 to achieve an accessed set of customer information. This set of customer information includes a predetermined amount of customer information. For example, in one embodiment, the predetermined amount of customer information is a predetermined number of digits of a social security number of the customer 156. For example, the predetermined number of digits is the last four digits of the social security number of the customer 156. In another embodiment, the predetermined amount of customer information is a zip code 128 of the customer 156. In yet another embodiment, the predetermined amount of customer information is a password 130 for the customer 156. Of note, the predetermined amount of customer information may be any type and quantity of customer information. In one embodiment, the customer-facing device 122 provides a request to the customer 156 for entry of a predetermined amount of customer information that is particular to the customer 156. Further, it should be appreciated that the set of customer information 124 may include one or more pieces of information about the customer 156. The consumer-facing device 122, in one embodiment, is coupled, via wire and/or wirelessly to the POS station 132, the driver's license information converter 100 and/or the server 200 (see FIG. 2). In another embodiment, the customer-facing device 122 (a device which enables input by the customer) is coupled, via wire and/or wirelessly, to a desktop or a mobile device remote from the store at which the goods and/or services exists. It should further be appreciated, that in various embodiments, the customer 185 may not be the person who is entering the set of customer information 135. A person at a call center or a store associate may be entering the set of customer information 135 into a system, the set of customer information 135, of which, is accessed by the customer information accessor 105.

The second comparer 118 compares the information 146 of the memory store 144 with the accessed set of customer information 124. In other words, in some embodiments, the first comparer 104 and the second comparer 118 work in tandem to compare the accessed data 154 and the accessed set of customer information 124 with the information 146 at the memory store 144.

The second match determiner 120, based on the performance of the second comparer 118, as well as the first comparer 104, determines if a match exists between the accessed data 154, the accessed set of customer information 124 and the information 146 of the memory store 144. If a match is found to exist, then the second matched profile information is identified. For example, the customer 156 scans the bar code 136 of his driver's license 134 using the bar code scanner 138 and the customer 156 enters his zip code 128 and his password 130 into the consumer-facing device 122. If the scanned bar code data and the set of customer information 124 match a predetermined portion of the information 146 of the memory store 144, then a match is found to exist. In this instance, the information 146 includes both the set of profile information 148 and the set of customer information 124. Of note, the set of customer information 124 may be input by other entities (e.g., store associate, call center employee, etc.) other than the customer 156. This predetermined portion of the information 146 may be one or more items of information, such as, but not limited to such, the last four digits of the customer's social security number, the zip code of the customer's address, the customer's prearranged password, etc.

In one embodiment, the credit card associated with the identified customer credit account is a store-branded credit card associated with an entity (business, not-for-profit organization, etc.) that provides goods and/or services. The "store" may be a merchant that provides goods and/or services, regardless as to whether or not the store is an actual physical place. For example, in one embodiment, the credit card associated with the identified customer credit account is a store-branded credit card associated with a retail store. In another embodiment, the credit card associated with the identified customer credit account in a store-branded credit card associated with a retail store other than the retail store at which the customer 156 is attempting to purchase an item. For example, a retail store "C" may have a partnership with a retail store "A", and either store may offer store-branded credit cards that may be used at one or more stores other than its own. In yet another embodiment, a credit account in not a store-branded ("non-branded-credit account"). For example, the credit account may be connected with, but is not limited to being, a retail store, a virtual store, an automobile loan account, etc.

In one embodiment, once the POS station 132 receives the credit verification 152 to charge the identified customer credit account, and the store associate has validated that the image of the customer 156 matches the image of the customer 156 as he is standing in front of the store associate, and that the name within the driver's license information and the linked credit account match the name on the driver's license 134 of the customer 156, then the POS station 132 may be used to process the transaction activity using the identified customer credit account, should the customer 156 so permit. The payment system 155 may then use this information to execute payment for an item. In one embodiment, the identified customer credit account may be presented to the store associate at a display screen 140. In another embodiment, the identified credit account may be presented to the customer 156 at the customer-facing device 122. The customer 156 may then cause a transactional activity to be executed through using the consumer-facing device 122.

FIG. 2 shows a system 230 for enabling a driver's license to be used as a credit card. The system 230 includes the driver's license information converter 100, a receiver 210; a memory device 215; a transmitter 220; and a processor 225. Coupled with the system 230 is the bar code scanner 138, the customer facing device 122, the POS station 132, a device with communication capabilities 205; and the server 200 (as discussed herein). In optional embodiments, the server 200 is communicatively coupled, via wire and/or wirelessly, with the device with communication capabilities 205, the bar code scanner 138, the POS station 132, and the customer-facing device 122. Of note, the server 200 may be part of, but not limited to, any of the following: a cloud; a virtual network; a virtual private network; a dedicated circuit; etc.

In one embodiment, the receiver 210 is configured to receive the scanned bar code information. In another embodiment, the receiver 210 is configured to receive the set of customer information 124. The receiver 210 may receive information, in various embodiments, from the server 200, the bar code scanner 138, the customer-facing device 122, the POS station 132 and/or the device with communication capabilities 205.

In one embodiment, the processor 225 is configured to process the computer-readable and computer-executable instructions (that may reside in any tangible computer readable storage media) such as the following modules described herein: the data accessor 102; the first comparer 104; the first match determiner 106; the customer credit account identifier 108; and the credit verification generator 110. In further various optional embodiments, the processor 225 is configured to process the computer-readable and computer-executable instructions (that may reside in any tangible computer readable storage media) such as the following modules described herein: the credit sender 112; the not found message generator 114; the set of customer information accessor 116; the second comparer 118; and the second match determiner 120.

In one embodiment, the transmitter 220 is configured to transmit to other components remote to the driver's license information converter 100 the credit verification 152 message, and the not found message.

Example Methods of Operation

Figure 3:
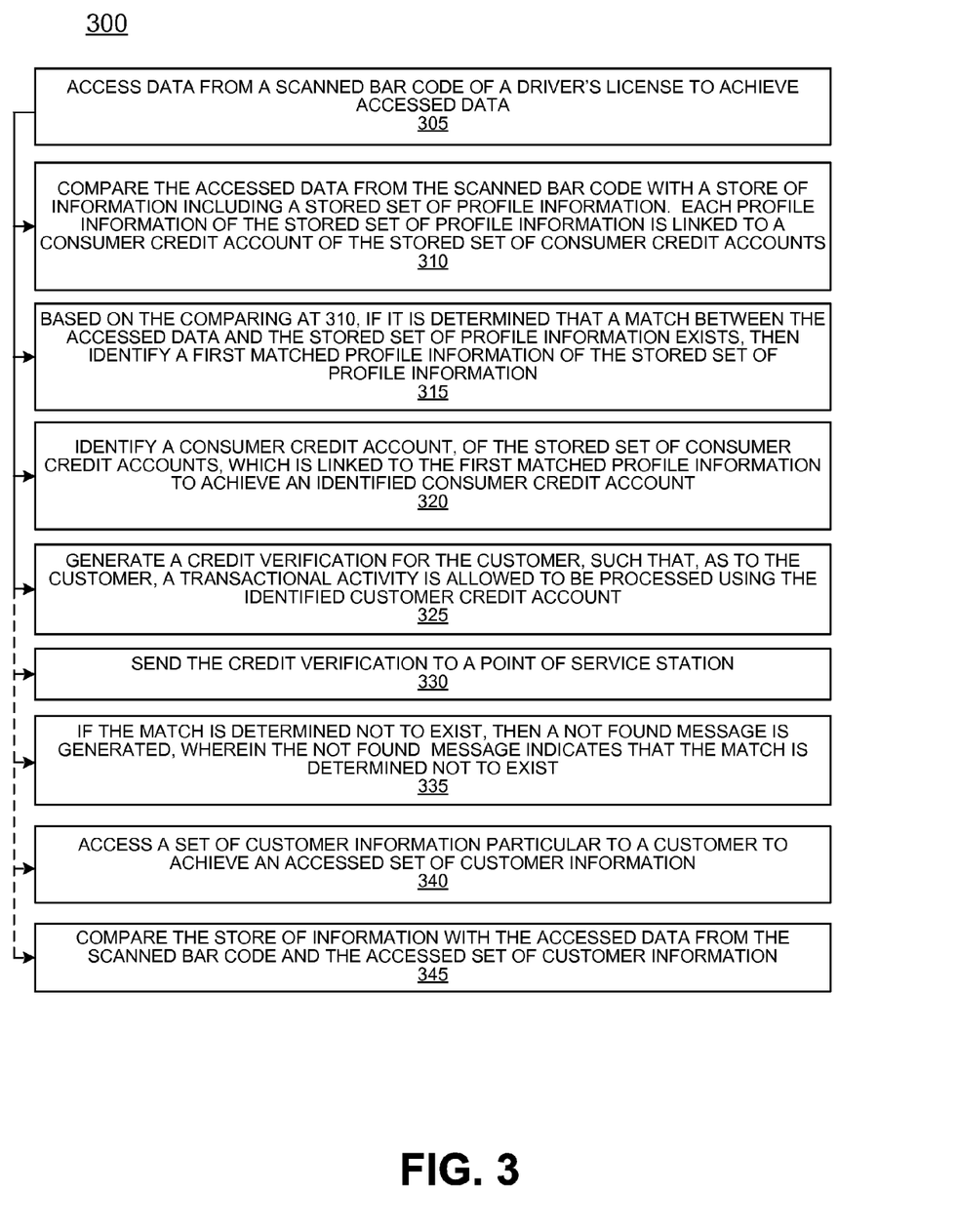
FIG. 3 depicts a flow diagram for a method for enabling a driver's license to be used as a credit account (e.g., credit card, etc.), in accordance with an embodiment.

The following discussion sets forth in detail some example methods of operation of embodiments. With reference to FIGS. 1-3, flow diagrams of method 300 illustrates an example procedure used by various embodiments. Method 300 includes some procedures that, in various embodiments, are carried out by a processor under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in method 300, such procedures are examples. That is, embodiments are well suited to performing various other procedures or variations of the procedures recited in method 300, alone or in combination. Likewise, in some embodiments, the procedures in method 300, alone or in combination, may be performed in an order different than presented and/or not all of the procedures described in one or more of these flow diagrams may be performed. It is further appreciated that procedures described in method 300, alone or in combination, may be implemented in hardware, or a combination of hardware with firmware and/or software.

FIG. 3 is a flow diagram of a method 300 for enabling a driver's license to be used as a credit account (e.g., credit card), in accordance with an embodiment. Although specific procedures are disclosed in method 300, embodiments are well suited to performing various other procedures or variations of the procedures recited in method 300. It is appreciated that the procedures in method 300 may be performed in an order different than presented, that not all of the procedures in method 300 may be performed, and that additional procedures to those illustrated and described may be performed. All of, or a portion of, the procedures described by method 300 can be implemented by a processor or computer system executing instructions which reside, for example, on computer-usable/readable media. The following discussion of method 300 references FIGS. 1, 2 and 3 unless specifically noted otherwise.

At step 305 of method 300, in one embodiment and as described herein, data from a scanned bar code of a driver's license is accessed.

At step 310 of method 300, in one embodiment and as described herein, the accessed data from the scanned bar code is compared with a store of information including a stored set of profile information. Each profile information of the stored set of profile information 148 is linked to a customer credit account of the stored set of customer credit accounts 150.

At step 315 of method 300, in one embodiment and as described herein, based on the comparing performed at step 310, if it is determined that a match between the accessed data and the stored set of profile information exists. If the match exists, then a first matched profile information of the stored set of profile information is identified.

At step 320 of method 300, in one embodiment and as described herein, a customer credit account, of the stored set of customer credit accounts 150, which is linked to the first matched profile information is identified to achieve an identified customer credit account.

At step 325 of method 300, in one embodiment and as described herein, an credit verification 152 for the customer 156 is generated, as to the customer 156, a particular transactional activity (e.g., sale, payment, return, void, etc.) is allowed to be processed using the identified customer credit account.

At step 330 of method 300, in one embodiment and as described herein, the credit verification 152 is sent to a point of service station 132. In one embodiment, the sending of the credit verification 152 to the POS station 132 includes sending the credit verification 152 to the transmitter 220. The transmitter 220 then transmits this credit verification 152 to the POS station 132. As noted herein, the POS station 132 may be any channel at which a transaction can be processed for a customer (e.g., Catalog, Web, Retail, Mobile, etc.)

At step 335 of method 300, in one embodiment and as described herein, if the match is determined not to exist, then a not found message is generated, wherein the not found message indicates that the match is determined not to exist.

At step 340 of method 300, in one embodiment and as described herein, a set of customer information particular to a customer 156 is accessed to achieve an accessed set of customer information. In one embodiment, the set of customer information 124 includes a predetermined amount of customer information particular to the customer 156, wherein the predetermined amount is, in various embodiments, a number of digits of a social security number 126 of the customer 156, a zip code 128 of the customer 156, and/or a password 130 for the customer 156.

At step 345 of method 300, in one embodiment and as described herein, the information of the store, in addition to the comparing with the accessed data from the scanned bar code, is compared with the accessed set of customer information. Further, based on the comparing, if it is determined that the match exists between the accessed data from the scanned bar code, the accessed set of customer information and the store of information, then a second matched driver's license information is identified.

Example Computer System

Figure 4:
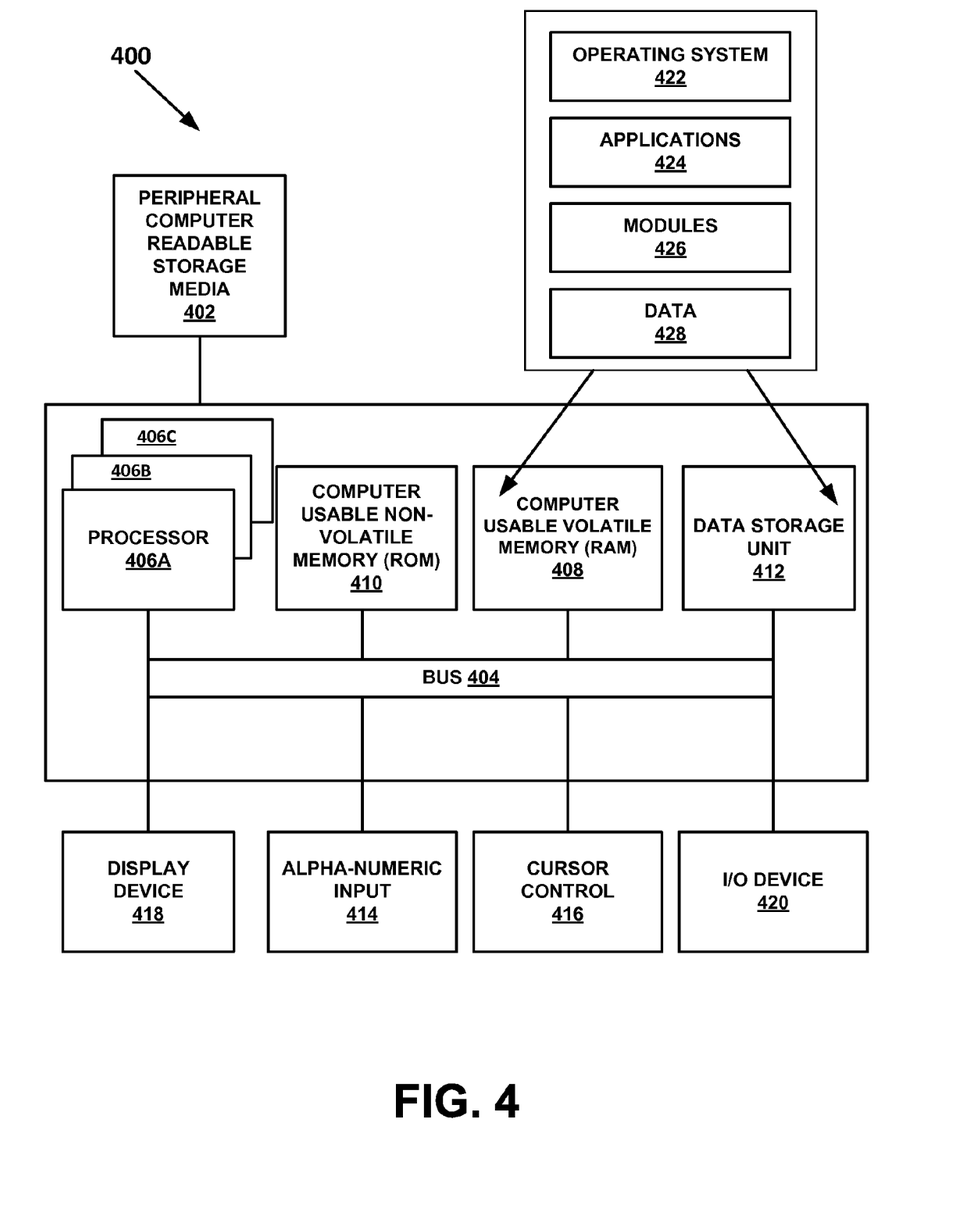
FIG. 4 is a block diagram of an example computer system with which or upon which various embodiments of the present invention may be implemented.

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments which are discussed herein. It is appreciated that computer system 400 of FIG. 4 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 400 of FIG. 4 is well adapted to having peripheral non-transitory computer-readable storage media 402 such as, for example, a floppy disk, a compact disc, digital versatile disc, other disc based storage, universal serial bus "thumb" drive, removable memory card, and the like coupled thereto.

System 400 of FIG. 4 includes an address/data bus 404 for communicating information, and a processor 406A coupled with bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g., random access memory (RAM), coupled with bus 704 for storing information and instructions for processors 406A, 406B, and 406C.

System 400 also includes computer usable non-volatile memory 410, e.g., read only memory (ROM), coupled with bus 404 for storing static information and instructions for processors 406A, 406B, and 406C. Also present in system 400 is a data storage unit 412 (e.g., a magnetic or optical disk and disk drive) coupled with bus 404 for storing information and instructions. System 400 also includes an optional alphanumeric input device 414 including alphanumeric and function keys coupled with bus 404 for communicating information and command selections to processor 406A or processors 406A, 406B, and 406C. System 400 also includes an optional cursor control device 416 coupled with bus 404 for communicating user input information and command selections to processor 406A or processors 406A, 406B, and 406C. In one embodiment, system 400 also includes an optional display device 418 coupled with bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418 and indicate user selections of selectable items displayed on display device 718. Many implementations of cursor control device 416 are known in the art including a trackball, mouse, touch pad, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 726, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

What we claim is:

1. An article of manufacture, which comprises a computer readable medium having stored therein a computer program for enabling a driver's license to be used as a credit account, said computer program comprising:
   a first code segment which, when executed on a computer, accesses data from a scanned bar code of a driver's license to achieve accessed data;
   a second code segment which, when executed on said computer, compares said accessed data from said scanned bar code to a store of information comprising a stored set of profile information, wherein each profile information of said stored set of profile information is linked to a customer credit account of a stored set of customer credit accounts;
   a third code segment which, when executed on said computer, based on said comparing, determines if a match between said accessed data and said stored set of profile information exists, wherein if said match exists, identifying a first matched profile information of said stored set of profile information;
   a fourth code segment which, when executed on said computer, identifies a customer credit account, of said stored set of customer credit accounts, linked to said first matched profile information to achieve an identified customer credit account; and
   a fifth code segment which, when executed on said computer, generates a credit verification for a customer, enabling said customer to cause a set of charges to be applied to said identified customer credit account.

2. The article of manufacture of claim 1, further comprising:
   a sixth code segment which, when executed on said computer, sends said credit verification to a point of service station.

3. The article of manufacture of claim 1, further comprising:
   a seventh code segment which, when executed on said computer, if said match is determined not to exist, then generates a not found message, wherein said not found message indicates that said match is determined not to exist.

4. The article of manufacture of claim 1, further comprising:
   an eighth code segment which, when executed on said computer, accesses a set of customer information particular to a customer to achieve an accessed set of customer information.

5. The article of manufacture of claim 4, further comprising:
   a ninth code segment which, when executed on said computer, compares said store of said information, in addition to said comparing said accessed data from said scanned bar code, with said accessed set of customer information; and
   a tenth code segment which, when executed on said computer, based on an execution of said ninth code segment, determines if said match exists between said accessed data from said scanned bar code, said accessed set of customer information and said store of information, wherein if said match exists, identifying a second matched profile information.

6. The article of manufacture of claim 4, wherein said set of customer information comprises a predetermined amount of customer information particular to said customer, wherein said predetermined amount is a number of digits of a social security number of said customer.

7. The article of manufacture of claim 4, wherein said set of customer information comprises a predetermined amount of customer information particular to said customer, wherein said predetermined amount is a zip code of said customer.

8. The article of manufacture of claim 4, wherein said set of customer information comprises a predetermined amount of customer information particular to said customer, wherein said predetermined amount is a password for said customer.

9. The article of manufacture of claim 1, wherein said credit account associated with said identified consumer credit account is a store-branded credit card.

10. A driver license information converter for enabling a driver's license to be used as a credit account, said driver license information converter comprising:
    a data accessor coupled with a computer, said data accessor configured for accessing data from a scanned bar code of a driver's license;
    a first comparer coupled with said computer, said first comparer configured for comparing said accessed data from said scanned bar code to a store of information comprising a stored set of profile information, wherein each profile information of said stored set of profile information is linked to a customer credit account of a stored set of customer credit accounts;
    a first match determiner coupled with said computer, said first match determiner configured for, based on said comparing, determining if a match between said accessed data and said stored set of profile information exists, and wherein if said match exists, identifying a matched stored set of profile information;

a customer credit account identifier coupled to said computer, said customer credit account identifier configured for identifying a customer credit account, of said stored set of customer credit accounts, linked to said matched stored set of profile information; and a credit verification generator coupled with said computer, said credit verification generator configured for generating a credit verification for a customer, such that, as to said customer, a transactional activity is allowed to be processed using the identified customer credit account.

11. The driver's license information converter of claim 10, further comprising:

a credit verification sender coupled with said computer, said credit verification sender configured for sending said credit verification to a point of service station.

12. The driver's license information converter of claim 10, further comprising:

a not found message generator coupled with said computer, said not found message generator configured for, if said match is determined not to exist, then generating a not found message, wherein said not found message indicates that said match is determined not to exist.

13. The driver's license information converter of claim 10, further comprising:

a set of customer information accessor coupled with said computer, said set of customer information accessor configured for accessing a set of customer information particular to a customer to achieve an accessed set of customer information.

14. The driver's license information converter of claim 13, further comprising:

a second comparer coupled with said computer, said second comparer configured for comparing said store of information with said accessed set of customer information, in addition to said accessed data from said scanned bar code; and a second match determiner coupled with said computer, said second match determiner configured for, based on said comparing, determining if said match exists between said accessed data from said scanned bar code, said accessed set of customer information and said store of information, wherein if said match exists, identifying said matched stored set of profile information.

15. The driver's license information converter of claim 13, wherein said set of customer information comprises a predetermined amount of customer information particular to said customer, wherein said predetermined amount is a number of digits of a social security number of said customer.

16. The driver's license information converter of claim 13, wherein said set of customer information comprises a predetermined amount of customer information particular to said customer, wherein said predetermined amount is a zip code of said customer.

17. The driver's license information converter of claim 13, wherein said set of customer information comprises a predetermined amount of customer information particular to said customer, wherein said predetermined amount is a password for said customer.

18. The driver's license information converter of claim 10, wherein a credit card associated with said identified customer credit account is a store-branded credit card.

19. A system for enabling a driver's license to be used as a credit card, said system comprising:

a receiver configured for receiving data from a scanned bar code of a driver's license of a customer to achieve received data;

a memory device configured for storing information, wherein said information comprises a stored set of profile information, wherein each profile information of said set of profile information is linked to customer credit account of a stored set of customer credit accounts;

a processor configured for:

accessing said received data from said scanned bar code of said driver's license to achieve accessed data;

comparing said accessed data to said stored set of profile information;

based on said comparing, determining if a match between said accessed data and said stored set of profile information exists, wherein if said match exists, identifying a matched stored set of profile information;

identifying a customer credit account, of said stored set of customer credit accounts, linked to said matched stored customer information to achieve an identified customer credit account; and generating an credit verification for said customer, such that, as to said customer, a transactional activity is allowed to be processed using the identified customer credit account;

sending said credit verification to a transmitter; and a transmitter configured for transmitting said credit verification to said point of service station.

20. The system of claim 19, wherein said processor further comprises:

if said match is determined not to exist, then generating a not found message, wherein said not found message indicates that said match is determined not to exist.

* * * * *